Figure 1:
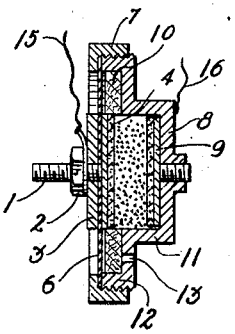

C. A. FINLEY.
DEVICE FOR TRANSLATING THE EFFECTS OF SOUND VIBRATIONS INTO VARIATIONS IN AN ELECTRICAL CIRCUIT.
APPLICATION FILED APR. 15, 1918.

1,406,833. Patented Feb. 14, 1922.

Inventor:
Charles A. Finley.
by. J.E.Roberts Atty.

UNITED STATES PATENT OFFICE.

CHARLES A. FINLEY, OF BROOKLYN, NEW YORK, ASSIGNOR TO WESTERN ELECTRIC COMPANY, INCORPORATED, OF NEW YORK, N. Y., A CORPORATION OF NEW YORK.

DEVICE FOR TRANSLATING THE EFFECTS OF SOUND VIBRATIONS INTO VARIATIONS IN AN ELECTRICAL CIRCUIT.

1,406,833.    Specification of Letters Patent.    Patented Feb. 14, 1922.

Application filed April 15, 1918. Serial No. 228,609.

*To all whom it may concern:*

Be it known that I, CHARLES A. FINLEY, a citizen of the United States, residing at Brooklyn, in the county of Kings and State of New York, have invented certain new and useful Improvements in a Device for Translating the Effects of Sound Vibrations into Variations in an Electrical Circuit, of which the following is a full, clear, concise, and exact description.

This invention relates to a device for use in translating the effects of sound vibrations into variations of current or potential in electrical circuit, which variations may be retranslated into sound through the agency of an ordinary telephone receiver.

While the device of the invention may be used to advantage as an element of the ordinary telephone transmitter, it is particularly adapted for use in detecting the presence of feeble sound vibrations either in water or in air.

An object of the invention is to provide a device of this character which is very sensitive and which at the same time is capable of translating sound vibrations into electrical impulses without appreciable distortion.

In accordance with a feature of the invention the entire element is adapted to be supported on a sound-receiving body or diaphragm to vibrate as a whole therewith, and a portion of such element is mounted so as to be capable of a movement independent of the sound-receiving body or diaphragm, which movement is due to the inertia of such portion.

As is well known in a moving system such as referred to above, there is a tendency for the moving portion, especially when responding to vibrations in the neighborhood of its natural frequency, to vibrate independently of the initiating vibrations. This effect is commonly known as resonance and interferes with the accurate reproduction of the vibration.

In accordance with a feature of the invention, this resonant effect and consequent distortion is checked without impairing the sensitiveness of the element by damping the moving system by means of mechanical friction, either in the form of rubbing friction between the moving system and an energy-absorbing material, or in the internal friction in a fluid such as air, which is displaced by the moving system or by a combination of both means.

More specifically in accordance with this feature of the invention, a member of energy-absorbing material such as felt is arranged to make rubbing contact with the moving system in the line of motion of such system. Also the moving system is arranged to cause the movement of a body of air through a small aperture or apertures, whereby the internal friction of the air or the friction of the air against the walls of the chamber in which it is confined is utilized to absorb energy and consequently to assist in damping the moving parts.

Figure 2:
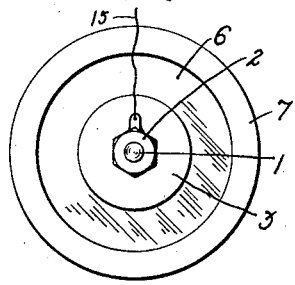

It will be observed as the description of the invention progresses that no springs or cushions are utilized to perform damping of the moving system, and consequently the sensitiveness of such moving system in responding to feeble vibrations is not impaired. These and other features of the invention not specifically mentioned above will more clearly appear from the annexed specification and the accompanying drawing in which Fig. 1 is a transverse section of a variable resistance element constructed in accordance with this invention, and Fig. 2 is a front elevation of the same.

The element disclosed which forms one embodiment consists of a substantially cylindrical cup member 8. The cup is provided with an outwardly extending flange, the edges 12 of which are formed parallel with the walls of the cup. Clamped between the edge 12 of the cup and an annular clamping flange 7 which is threaded thereon is a diaphragm 6 which may be of mica or other similar insulating material. The cup member and diaphragm provide two cylindrical chambers, one of which is of smaller diameter than the other. In the smaller chamber, which for convenience may be referred to as the carbon chamber since in the embodiment of the invention disclosed it contains a quantity of carbon granules, is secured an electrode 9, which is fastened to the rear wall of the cup in any convenient manner. The side walls of this chamber are formed by the cylindrical walls of the cup and a ring 10 of felt or other similar energy-absorbing material which is seated in the chamber of larger diameter. These side walls of the cup may be and preferably are provided with a coating of insulating material. The inner edge of the felt ring forms a continuation of the cylindrical walls of the carbon chamber, and a portion of such edge also embraces and is in frictional engagement with an electrode 4 which is mounted upon the diaphragm 6. The electrode 4 is provided with a stem 1 which passes through an aperture in the diaphragm 6 and through a washer 3 which is located on the opposite side of the diaphragm. A nut 2 threaded upon the stem 1, serves to clamp the diaphragm between the rear surface of the electrode 4 and the washer 3.

It will be observed that the felt ring is of less depth than the chamber in which it is seated, so that an air space is provided between the surface of the felt ring and the diaphragm. Therefore, the felt does not make contact with the diaphragm and consequently does not impair the sensitiveness of such diaphragm to vibration. The flange of the cup 8 is provided with a plurality of perforations, one of which is indicated at 13, such perforations forming an outlet or inlet for the air included between the wall 11, the edge 12 and the diaphragm 6, permitting the exit and ingress of the air in response to movement of the diaphragm.

In use, the entire element is supported on a sound-receiving body or diaphragm (not shown) which may be, when the device is used for the detection of sound under water, the side of a ship or the wall of a mine casing. The element may be attached to such sound-receiving body by means of the stem 1, which may be threaded into an aperture tapped into such body or attached in any other similar manner.

The operation of the device when so supported may be described as follows, it being assumed that the electrical terminals 15 and 16 are connected in the usual telephone circuit, including a telephone receiver and a source of energy.

The sound waves impinging upon the sound-receiving body sets such sound-receiving body in vibration. Inasmuch as the front electrode is fixedly secured to the sound-receiving body by the stem 1, it will vibrate with such sound-receiving body. Because of the resiliency of the diaphragm 6, the cup and the electrode 9 carried thereby is capable of movement independent of the sound-receiving body and thus constitutes the moving system of the element. Since this moving system has considerable inertia, although it will follow the vibrations of the sound-receiving body, there will be a relative movement between the electrodes 4 and 9 which will reproduce the vibrations of the sound-receiving body. This relative movement will cause a corresponding compression or separation of the carbon granules included in the carbon chamber and a consequent variation in resistance in the electrical circuit including the electrodes 4 and 9. This variation in the resistance of the electrical circuit may be utilized as is well known to actuate an ordinary telephone receiver.

Experiments have demonstrated that unless some means is provided to damp the relative movement of the moving system and the sound-receiving body, the reproduction of the electrical circuit will be distorted due to resonance; that is to say, at certain frequencies of vibration the moving system will not accurately follow the vibration of the sound-receiving body. It is also well known that this tendency to resonance may be reduced by damping the moving system and it has heretofore been proposed to use either springs or some easily compressible material between the relatively fixed and moving parts to damp the moving part. This method of damping, however, has a tendency to impair the sensitiveness and consequent response of the moving system to feeble vibrations. It will be observed that the relative movement between the moving system and the fixed part of the element of the invention causes the inner edge of the felt ring 10 to rub over the periphery of the electrode 4. A certain amount of energy is therefore dissipated in friction between these two parts. Furthermore, the movement of the moving system alters the dimension of the chamber formed between the rear wall of the flange of the cup and the diaphragm 6, which forces the air included in such chamber through the perforations such as 13. Due to the viscosity of the air and the friction of the air with the sides of the aperture 13, a certain amount of energy is dissipated by this means. Therefore, the moving system is frictionally damped without impairing the sensitiveness of such moving system.

It is apparent that the invention is particularly concerned with the moving system of a vibration responsive device and that the invention may be applied to vibration responsive devices of various types embodying various forms of current varying means.

What is claimed is:

1. A device for converting sound vibrations into variations in an electrical circuit comprising a cup member having a constricted outlet, a diaphragm forming a closure for the cup member, an electrode mounted on said diaphragm and a second electrode mounted in said cup, means for damping relative movement between said diaphragm and said cup member comprising a member of energy-absorbing material interposed between the electrode carried by the diaphragm and the cup and the viscosity of the air included between said cup and diaphragm, and means responsive to the relative movement between said electrodes for causing variations in an electrical circuit.

2. A device for converting sound vibrations into variations in an electrical circuit comprising a pair of electrodes, means forming a chamber around one of said electrodes for supporting the other, said means having openings therein leading from the chamber, and means for damping the relative movement between said electrodes, said damping means comprising a ring of energy-absorbing material practically filling said chamber and in frictional engagement with one of said electrodes and the air in the chamber.

In witness whereof, I hereunto subscribe my name this 10th day of April A. D., 1918.

CHARLES A. FINLEY.